(12) United States Patent
Zhu et al.

(10) Patent No.: US 10,249,260 B2
(45) Date of Patent: Apr. 2, 2019

(54) IMAGE COLOR ENHANCEMENT METHOD INCLUDING CONVERSIONS OF COLOR PARAMETERS OF PIXELS

(71) Applicant: SHENZHEN CHINA STAR OPTOELECTRONICS TECHNOLOGY CO., LTD., Shenzhen (CN)

(72) Inventors: Junling Zhu, Shenzhen (CN); Hao Li, Shenzhen (CN); Shensian Syu, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 10 days.

(21) Appl. No.: 14/779,672

(22) PCT Filed: Aug. 24, 2015

(86) PCT No.: PCT/CN2015/087935
§ 371 (c)(1),
(2) Date: Sep. 24, 2015

(87) PCT Pub. No.: WO2017/024615
PCT Pub. Date: Feb. 16, 2017

(65) Prior Publication Data
US 2018/0190239 A1 Jul. 5, 2018

(30) Foreign Application Priority Data
Aug. 10, 2015 (CN) .......................... 2015 1 0485891

(51) Int. Cl.
*H04N 9/64* (2006.01)
*G09G 5/02* (2006.01)
(Continued)

(52) U.S. Cl.
CPC .................. *G09G 5/02* (2013.01); *G06T 5/00* (2013.01); *G06T 5/009* (2013.01); *G06T 11/001* (2013.01);
(Continued)

(58) Field of Classification Search
CPC .................. G06T 2207/10024; G09G 2320/02
(Continued)

(56) References Cited

U.S. PATENT DOCUMENTS 4,672,439 A 6/1987 Florence et al.
8,421,925 B2 * 4/2013 Su ............................ G09G 5/02
348/649

(Continued)

FOREIGN PATENT DOCUMENTS

| CN | 101790101 A | 7/2010 |
| CN | 103780797 A | 5/2014 |
| CN | 104284168 A | 1/2015 |

*Primary Examiner* — Thomas J Lett
(74) *Attorney, Agent, or Firm* — Mark M. Friedman

(57) ABSTRACT

An image enhancement method is provided, the method includes steps of converting grayscale values for each pixel of a preset image into a hue value, a color saturation value, and an intensity value for each pixel of the preset image; performing an enhancement process on the color saturation value for each pixel of the predetermined image; rectifying the color saturation value for each pixel of the preset image; and converting the post-rectified hue value, the post-rectified color saturation value, and the post-rectified intensity value for each pixel of the preset image into post-rectified grayscale values for each pixel of a preset image.

18 Claims, 2 Drawing Sheets

(51) Int. Cl.
*G06T 5/00* (2006.01)
*G06T 11/00* (2006.01)

(52) U.S. Cl.
CPC ............... *G09G 5/026* (2013.01); *H04N 9/64* (2013.01); *G06T 2207/10024* (2013.01); *G09G 2320/0242* (2013.01); *G09G 2340/06* (2013.01)

(58) Field of Classification Search
USPC ........................................................ 345/604
See application file for complete search history.

(56) References Cited

U.S. PATENT DOCUMENTS

| | | | |
|---|---|---|---|
| 2013/0188824 A1* | 7/2013 | Hou | ........................ G06T 1/005 382/100 |
| 2016/0035066 A1 | 2/2016 | Zhang et al. | |
| 2016/0110845 A1 | 4/2016 | Wu | |

* cited by examiner

IMAGE COLOR ENHANCEMENT METHOD INCLUDING CONVERSIONS OF COLOR PARAMETERS OF PIXELS

BACKGROUND OF THE INVENTION

Field of the Invention

The present invention relates to a field of image processing, and more particularly to an image enhancement method.

Description of Prior Art

With the developments in the field of display technology, people are increasingly demanding displayed images, especially color images. Due to the constraints of various factors of display devices, there are often some problems with the color images displayed on display devices such as dim colors, inadequate contrast, inconspicuous local details, etc. so that it is difficult to identify and distinguish a target in an image. Thus, it is often necessary to process a color image with an enhancement process before the color image is displayed in order to enlarge the differences between distinct object features in the image, and thereby the visual effect of the image is improved.

A conventional image enhancement method is generally to convert an RGB image into an HSI color space, and then the color saturation of the image is exponentially enhanced. However, the aforementioned method is prone to generating a phenomenon of color shift.

Therefore, there is a need of providing an image enhancement method to solve the problems of the prior art.

SUMMARY OF THE INVENTION

The objective of the present invention is to provide an image enhancement method which can prevent a color shift phenomenon from being generated so that a technical problem of a color shift phenomenon which is prone to be generated in an image enhancement method of the prior art can be solved.

To solve the foregoing problem, the present invention provides a technical solution as follows:

According to an embodiment of the present invention, an image enhancement method comprises:

converting a red grayscale value, a green grayscale value, and a blue grayscale value for each pixel of a preset image represented in an RGB color model into a hue value, a color saturation value, and an intensity value for each pixel of the preset image represented in an HSI color space;

performing an enhancement process on the color saturation value for each pixel of the preset image;

rectifying the color saturation value for each pixel of the preset image according to the intensity value of each pixel of the preset image and a preset intensity threshold to avoid a color shift phenomenon of the preset image; and converting the hue value, the color saturation value, and the intensity value for each pixel of the preset image, which has been rectified as a rectified preset image, into a red grayscale value, a green grayscale value, and a blue grayscale value for each pixel of the rectified preset image to facilitate the image display;

wherein the red grayscale value, the green grayscale value, and the blue grayscale value for each pixel of the preset image represented in the RGB color model are converted into the hue value, the color saturation value, and the intensity value for each pixel of a preset image represented in an HSI color space according to the following formulas:

$$H = \begin{cases} \theta & B \leq G \\ 360 - \theta & B > G \end{cases}$$

$$\theta = \arccos\left[\frac{\{(R-G)+(R-B)\}/2}{\sqrt{(R-G)^2 + (R-B)(G-B)}}\right]$$

$$S = 1 - \frac{3}{(R+G+B)}[\min(R, G, B)]$$

$$I = \frac{1}{3}(R+G+B)$$

where R is a red grayscale value of a given pixel; B is a blue grayscale value of a given pixel; G is a green grayscale value of a given pixel; H is a hue value of a given pixel; S is a saturation value of a given pixel; and I is an intensity value of a given pixel;

wherein the following formula is used to perform the enhancement process on the color saturation value for each pixel of the preset image:

$$S\_enh = S^\wedge(\min(R,G,B)/\max(R,G,B))$$

where S_enh is a color saturation value of a given pixel which has been subjected to the enhancement process; min (R, G, B) is a minimum value among the red grayscale value of a given pixel, the green grayscale value of a given pixel, and the blue grayscale value of a given pixel; max (R, G, B) is a maximum value among the red grayscale value of a given pixel, the green grayscale value of a given pixel, and the blue grayscale value of a given pixel.

In the above image enhancement method, the step of rectifying the color saturation value for each pixel of the preset image to avoid a color shift phenomenon of the preset image according to the intensity value and a preset intensity threshold of each pixel of the preset image further comprises:

determining whether the intensity value of a given pixel in the preset image is greater than the preset intensity threshold; and rectifying the color saturation value of the given pixel in light of the following formula when the intensity value of the given pixel is greater than the preset intensity threshold:

$$S\_ame = \begin{cases} S\_enh & S\_enh \leq 2\left(\frac{1}{I}-1\right) \\ 2\left(\frac{1}{I}-1\right) & S\_enh > 2\left(\frac{1}{I}-1\right) \end{cases}$$

where S_ame is a rectified color saturation value of the given pixel.

In the above image enhancement method, the step of rectifying the color saturation value for each pixel of the preset image to avoid a color shift phenomenon of the preset image according to the intensity value and a preset intensity threshold of each pixel of the preset image further comprises:

calculating a red grayscale value, a green grayscale value, and a blue grayscale value of the given pixel for a condition that the given pixel has been subjected to an enhancement process when the intensity value of a given pixel is less than or equal to the preset intensity threshold; and rectifying the color saturation value of the given pixel according to the red grayscale value, the blue grayscale value, and the green grayscale value of the given pixel for the condition that the given pixel has been subjected to the enhancement process.

In the above image enhancement method, the red grayscale value, the green grayscale value, and the blue grayscale value for the condition that the given pixel has been subjected to the enhancement process are calculated by the following formulas:

$$C1 = I(1 - S\_enh)$$
$$C2 = I\left[1 + \frac{S\_enh^*\cos \hat{H}}{\cos(60° - \hat{H})}\right]$$
$$C3 = 3I - (C1 + C2)$$

wherein when the hue value of the pixel processed by the enhancement process is greater than 0° and less than 120°, C2 represents a red grayscale value of the pixel processed by the enhancement process, C1 represents a blue grayscale value of the pixel processed by the enhancement process, and C3 represents a green grayscale value of the pixel processed by the enhancement process;

wherein when the hue value of the pixel processed by the enhancement process is greater than 120° and less than 240°, C1 represents a red grayscale value of the pixel processed by the enhancement process, C3 represents a blue grayscale value of the pixel processed by the enhancement process, and C2 represents a green grayscale value of t the pixel processed by the enhancement process; and wherein when the hue value of the pixel processed by the enhancement process is greater than 240° and less than 360°, C3 represents a red grayscale value of the pixel processed by the enhancement process, C2 represents a blue grayscale value of the pixel processed by the enhancement process, and C1 represents a green grayscale value of the pixel processed by the enhancement process.

In the above image enhancement method, the step of rectifying the color saturation value of the given pixel according to the red grayscale value, the blue grayscale value and the green grayscale value of the given pixel which have been subjected to the enhancement process comprises:

when C2 is less than 1 and C3 is less than 1, the color saturation value of the given pixel is not rectified.

In the above image enhancement method, the step of rectifying the color saturation value of the given pixel according to the red grayscale value, the blue grayscale value and the green grayscale value of the given pixel which have been subjected to the enhancement process comprises:

when C2 is greater than 1, the color saturation value of the given pixel after being rectified is calculated by the following formula:

$$1 = I\left[1 + \frac{S\_ame^*\cos \hat{H}}{\cos(60° - \hat{H})}\right].$$

In the above image enhancement method, the step of rectifying the color saturation value of the given pixel according to the red grayscale value, the blue grayscale value, and the green grayscale value of the given pixel which have been subjected to the enhancement process comprises:

when C3 is greater than 1, the color saturation value of the given pixel after being rectified is calculated by the following formulas:

$$1 = 3I - (C1 + C2)$$
$$C1 = I(1 - S\_ame)$$
$$C2 = I\left[1 + \frac{S\_ame^*\cos \hat{H}}{\cos(60° - \hat{H})}\right].$$

In the above image enhancement method, the hue value, color saturation value, and intensity value for each pixel of the rectified preset image are converted into a red, green, and blue grayscale values for each pixel of the rectified preset image according to the following formulas:

$$C1' = I(1 - S\_ame)$$
$$C2' = I\left[1 + \frac{S\_ame^*\cos \hat{H}}{\cos(60° - \hat{H})}\right]$$
$$C3' = 3I - (C1' + C2')$$

wherein when the hue value of the given pixel after be rectified is greater than 0° and less than 120°, C2' represents a red grayscale value of given pixel after being rectified, C1' represents a blue grayscale value of the given pixel after being rectified, and C3' represents a green grayscale value of the given pixel after being rectified;

wherein when the hue value of the given pixel after being rectified is greater than 120° and less than 240°, C1' represents a red grayscale value of the given pixel after being rectified, C3' represents a blue grayscale value of the given pixel after being rectified, and C2' represents a green grayscale value of the given pixel after being rectified; and wherein when the hue value of the given pixel after being rectified is greater than 240° and less than 360°, C3' represents a red grayscale value of the given pixel after being rectified, C2' represents a blue grayscale value of the given pixel after being rectified, and C1' represents a green grayscale value of the given pixel after being rectified.

According to another embodiment of the present invention, an image enhancement method is provided, comprising:

converting a red grayscale value, a green grayscale value, and a blue grayscale value for each pixel of a preset image represented in an RGB color model into a hue value, a color saturation value, and an intensity value for each pixel of the preset image represented in an HSI color space;

performing an enhancement process on the color saturation value for each pixel of the preset image;

rectifying the color saturation value for each pixel of the preset image according to the intensity value of each pixel of the preset image and a preset intensity threshold to avoid a color shift phenomenon of the preset image; and converting the hue value, the color saturation value, and the intensity value for each pixel of the preset image, which has been rectified as a rectified preset image, into a red grayscale value, a green grayscale value, and a blue grayscale value for each pixel of the rectified preset image to facilitate the image display.

In the above image enhancement method, the red grayscale value, the green grayscale value, and the blue grayscale value for each pixel of the preset image represented in the RGB color model are converted into the hue value, the color saturation value, and the intensity value for each pixel of a preset image represented in an HSI color space according to the following formulas:

$$H = \begin{cases} \theta & B \le G \\ 360 - \theta & B > G \end{cases}$$

$$\theta = \arccos\left[\frac{\{(R-G)+(R-B)\}/2}{\sqrt{(R-G)^2+(R-B)(G-B)}}\right]$$

$$S = 1 - \frac{3}{(R+G+B)}[\min(R,G,B)]$$

$$I = \frac{1}{3}(R+G+B)$$

where R is a red grayscale value of a given pixel; B is a blue grayscale value of a given pixel; G is a green grayscale value of a given pixel; H is a hue value of a given pixel; S is a saturation value of a given pixel; and I is an intensity value of a given pixel.

In the above image enhancement method, the following formula is used to perform the enhancement process on the color saturation value for each pixel of the preset image:

$$S\_enh = S\hat{\,}(\min(R,G,B)/\max(R,G,B))$$

where S_enh is a color saturation value of a given pixel which has been subjected to the enhancement process; min (R, G, B) is a minimum value among the red grayscale value of a given pixel, the green grayscale value of a given pixel, and the blue grayscale value of a given pixel; max (R, G, B) is a maximum value among the red grayscale value of a given pixel, the green grayscale value of a given pixel, and the blue grayscale value of a given pixel.

In the above image enhancement method, the step of rectifying the color saturation value for each pixel of the preset image to avoid a color shift phenomenon of the preset image according to the intensity value and a preset intensity threshold of each pixel of the preset image further comprises:

determining whether the intensity value of a given pixel in the preset image is greater than the preset intensity threshold; and rectifying the color saturation value of the given pixel in light of the following formula when the intensity value of the given pixel is greater than the preset intensity threshold:

$$S\_ame = \begin{cases} S\_enh & S\_enh \le 2\left(\frac{1}{I}-1\right) \\ 2\left(\frac{1}{I}-1\right) & S\_enh > 2\left(\frac{1}{I}-1\right) \end{cases}$$

where S_ame is a rectified color saturation value of the given pixel.

In the above image enhancement method, the step of rectifying the color saturation value for each pixel of the preset image to avoid a color shift phenomenon of the preset image according to the intensity value and a preset intensity threshold of each pixel of the preset image further comprises:

calculating a red grayscale value, a green grayscale value, and a blue grayscale value of the given pixel for a condition that the given pixel has been subjected to an enhancement process when the intensity value of a given pixel is less than or equal to the preset intensity threshold; and rectifying the color saturation value of the given pixel according to the red grayscale value, the blue grayscale value, and the green grayscale value of the given pixel for the condition that the given pixel has been subjected to the enhancement process.

In the above image enhancement method, the red grayscale value, the green grayscale value, and the blue grayscale value for the condition that the given pixel has been subjected to the enhancement process are calculated by the following formulas:

$$C1 = I(1 - S\_enh)$$

$$C2 = I\left[1 + \frac{S\_enh^*\cos \hat{H}}{\cos(60° - \hat{H})}\right]$$

$$C3 = 3I - (C1 + C2)$$

wherein when the hue value of the pixel processed by the enhancement process is greater than 0° and less than 120°, C2 represents a red grayscale value of the pixel processed by the enhancement process, C1 represents a blue grayscale value of the pixel processed by the enhancement process, and C3 represents a green grayscale value of the pixel processed by the enhancement process;

wherein when the hue value of the pixel processed by the enhancement process is greater than 120° and less than 240°, C1 represents a red grayscale value of the pixel processed by the enhancement process, C3 represents a blue grayscale value of the pixel processed by the enhancement process, and C2 represents a green grayscale value of t the pixel processed by the enhancement process; and wherein when the hue value of the pixel processed by the enhancement process is greater than 240° and less than 360°, C3 represents a red grayscale value of the pixel processed by the enhancement process, C2 represents a blue grayscale value of the pixel processed by the enhancement process, and C1 represents a green grayscale value of the pixel processed by the enhancement process.

In the above image enhancement method, the step of rectifying the color saturation value of the given pixel according to the red grayscale value, the blue grayscale value and the green grayscale value of the given pixel which have been subjected to the enhancement process comprises:

when C2 is less than 1 and C3 is less than 1, the color saturation value of the given pixel is not rectified.

In the above image enhancement method, the step of rectifying the color saturation value of the given pixel according to the red grayscale value, the blue grayscale value and the green grayscale value of the given pixel which have been subjected to the enhancement process comprises:

when C2 is greater than 1, the color saturation value of the given pixel after being rectified is calculated by the following formula:

$$1 = I\left[1 + \frac{S\_ame^*\cos \hat{H}}{\cos(60° - \hat{H})}\right].$$

In the above image enhancement method, the step of rectifying the color saturation value of the given pixel according to the red grayscale value, the blue grayscale value, and the green grayscale value of the given pixel which have been subjected to the enhancement process comprises:

when C3 is greater than 1, the color saturation value of the given pixel after being rectified is calculated by the following formulas:

$$1 = 3I - (C1 + C2)$$
$$C1 = I(1 - S\_ame)$$
$$C2 = I\left[1 + \frac{S\_ame^* \cos \hat{H}}{\cos(60° - \hat{H})}\right].$$

In the above image enhancement method, the hue value, color saturation value, and intensity value for each pixel of the rectified preset image are converted into a red, green, and blue grayscale values for each pixel of the rectified preset image according to the following formulas:

$$C1' = I(1 - S\_ame)$$
$$C2' = I\left[1 + \frac{S\_ame^* \cos \hat{H}}{\cos(60° - \hat{H})}\right]$$
$$C3' = 3I - (C1' + C2')$$

wherein when the hue value of the given pixel after be rectified is greater than 0° and less than 120°, C2' represents a red grayscale value of given pixel after being rectified, C1' represents a blue grayscale value of the given pixel after being rectified, and C3' represents a green grayscale value of the given pixel after being rectified;

wherein when the hue value of the given pixel after being rectified is greater than 120° and less than 240°, C1' represents a red grayscale value of the given pixel after being rectified, C3' represents a blue grayscale value of the given pixel after being rectified, and C2' represents a green grayscale value of the given pixel after being rectified; and wherein when the hue value of the given pixel after being rectified is greater than 240° and less than 360°, C3' represents a red grayscale value of the given pixel after being rectified, C2' represents a blue grayscale value of the given pixel after being rectified, and C1' represents a green grayscale value of the given pixel after being rectified.

In comparison with a conventional image enhancement method, the image enhancement method of the present invention performs enhancement processes and rectification processes on a color saturation value of a given pixel by means of a basic principle, i.e. keeping a hue value of each pixel unchanged, and as a result a phenomenon of a color shift generated in the prior art can be avoided and the technical problem of a phenomenon of a color shift which is prone to be generated in the conventional image enhancement method is solved.

To allow the foregoing summary of the present invention to be more clearly understood, there are preferred embodiments, which proceed with reference to the accompanying drawings, and are described in detail as follows.

DETAILED DESCRIPTION OF THE INVENTION

The preferred embodiments of the present invention will be detailed below in combination with the accompanying drawings. Spatially relative terms herein mentioned, such as "above", "beneath", "front", "back", "left", "right", "inner", "outer", "lateral", and the like may be used to describe one element's relationship to another element(s) as illustrated in the figures. Therefore, the spatially relative terms are used to describe and understand the present invention, but not to limit the invention.

The drawings are drawn schematically and the same reference numbers are used to indicate the same or similar components throughout the drawings.

Figure 1:
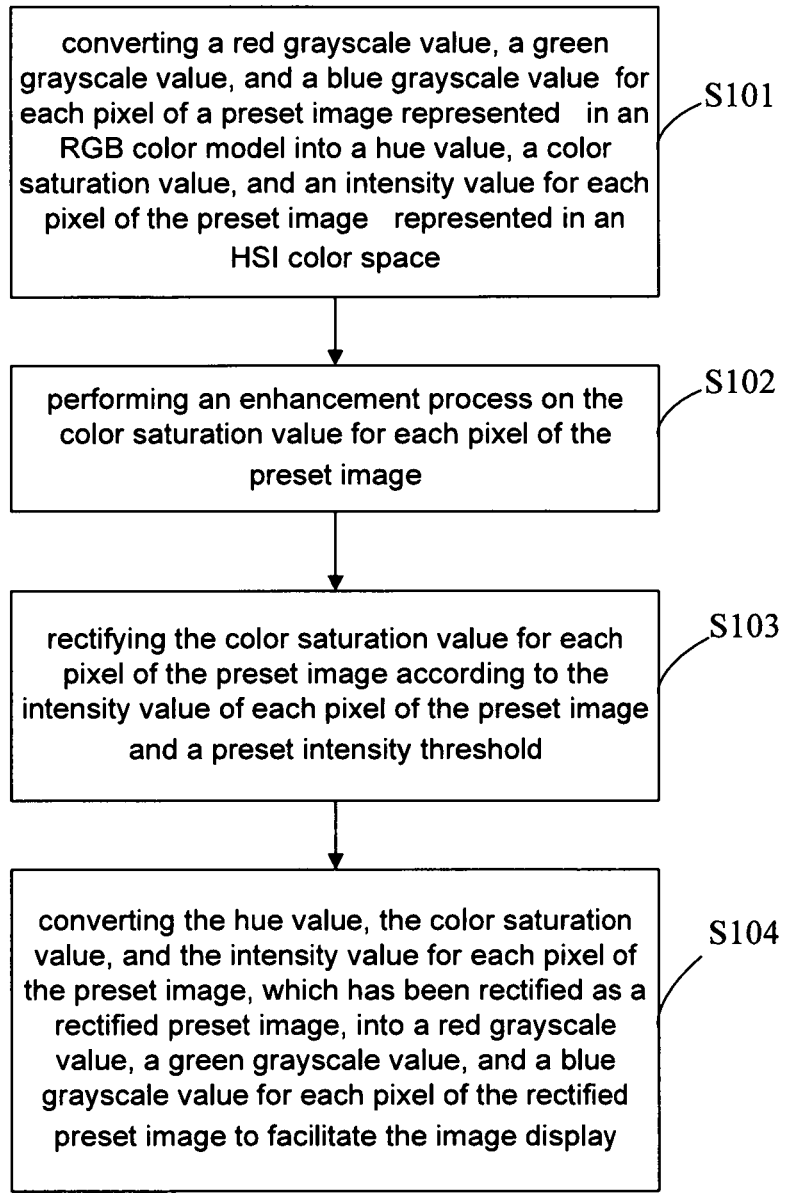
FIG. 1 is a flow chart showing an image enhancement method according to a preferred embodiment of the present invention.
Figure 2:
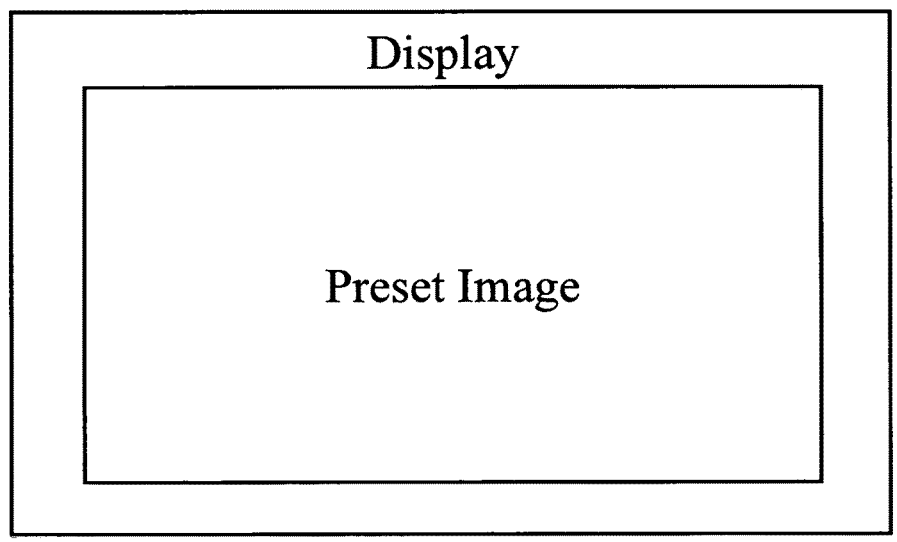
FIG. 2 is a schematic view showing a display with a preset image for the image enhancement method

Referring to FIG. 1, a flow chart shows an image enhancement method according to a preferred embodiment of the present invention, and FIG. 2 shows a schematic view of a display with a preset image for the image enhancement method. According to a preferred embodiment of the present invention, the image enhancement method comprises:

Step S101: A red grayscale value, a green grayscale value, and a blue grayscale value for each pixel of a preset image represented in an RGB color model are converted into a hue value, a color saturation value, and an intensity value for each pixel of the preset image represented in an HSI color space.

Step S102: The color saturation value is performed with an enhancement process for each pixel of the preset image.

Step S103: According to the intensity value and a preset intensity threshold of each pixel of the preset image, the color saturation value is rectified for each pixel of the preset image.

Step S104: The hue value, the color saturation value, and the intensity value for each pixel of the preset image, which has been rectified as a rectified preset image, are converted into a red grayscale value, a green grayscale value, and a blue grayscale value for each pixel of the rectified preset image.

The specific processes of each step for the image enhancement method according to the present preferred embodiment are described below in details.

In the step S101, an image enhancement device converts the red, green, and blue grayscale value, i.e. normalized grayscale values, for each pixel of the preset image represented in the RGB color model into the hue value, color saturation value, and intensity value for each pixel of a preset image represented in an HSI color space.

The RGB color model refers to each pixel of the preset image formed by superposing a red, a blue, and a green light, so that the grayscale value of red, green, and blue color components can be used to represent colors for each pixel of the preset image. The RGB color model is instrumental in quantization of image display by machines.

HSI color space is a departure from the human visual perception system, and it uses terms, i.e. hue, color saturation, and intensity, to represent a color in each pixel of the preset image.

For the image enhancement, we need to base on the human visual system, and therefore it is necessary to convert the representation of the preset image at the first step. Specific conversion formulas are as follows:

$$H = \begin{cases} \theta & B \leq G \\ 360 - \theta & B > G \end{cases}$$

$$\theta = \arccos\left[\frac{\{(R-G)+(R-B)\}/2}{\sqrt{(R-G)^2+(R-B)(G-B)}}\right]$$

$$S = 1 - \frac{3}{(R+G+B)}[\min(R,G,B)]$$

$$I = \frac{1}{3}(R+G+B)$$

where R is a grayscale value of a red color component of a given pixel, i.e. a red grayscale value; B is a grayscale value of a blue color component of a given pixel, i.e. a blue grayscale value; and G is a grayscale value of a green color component of a given pixel, i.e. a green grayscale value; where H is a hue value of a given pixel; S is a saturation value of a given pixel; and I is an intensity value of a given pixel. Next, go to the step S102.

In the step S102, the image enhancement device performs an enhancement process on the color saturation value for each pixel of the preset image. The principle here is that the enhancement of the color saturation value gets a smaller weighting for those less-saturated pixels, and the enhancement of the color saturation value gets a larger weighting for those higher-saturated pixels. A specific formulas of the enhancement process is as follows:

$$S\_enh = S\hat{}(\min(R,G,B)/\max(R,G,B))$$

where S_enh is a color saturation value of a given pixel which has been subjected to the enhancement process; min (R, G, B) is a minimum value among the red grayscale value of a given pixel, the green grayscale value of a given pixel, and the blue grayscale value of a given pixel; max (R, G, B) is a maximum value among the red grayscale value of a given pixel, the green grayscale value of a given pixel, and the blue grayscale value of a given pixel. Next, go to the step S103.

In the step S103, the image enhancement device rectifies the color saturation value for each pixel of the preset image according to the intensity value of each pixel of the preset image and a preset intensity threshold. Specific operations are as follows:

First, the image enhancement device determines whether the intensity value is greater than the preset intensity threshold of a given pixel in the preset image, in which the intensity threshold is an empirical value.

When the intensity value of a given pixel is greater than the preset intensity threshold, the color saturation value of the given pixel is rectified in light of the following formula:

$$S\_ame = \begin{cases} S\_enh & S\_enh \leq 2\left(\frac{1}{I}-1\right) \\ 2\left(\frac{1}{I}-1\right) & S\_enh > 2\left(\frac{1}{I}-1\right) \end{cases}$$

where S_ame is a rectified color saturation value of the given pixel.

For those pixels with larger intensity value, the color saturation value is rectified only for those higher-saturated pixels. Accordingly, it can be avoided that a difference of the post-rectified color saturation values among the pixels is too large.

When the intensity value of a given pixel is less than or equal to the preset intensity threshold, a red grayscale value, a green grayscale value, and a blue grayscale value for the condition that the given pixel which has been subjected to the enhancement process are calculated by the following formulas:

$$C1 = I(1 - S\_enh)$$

$$C2 = I\left[1 + \frac{S\_enh^* \cos\hat{H}}{\cos(60° - \hat{H})}\right]$$

$$C3 = 3I - (C1 + C2)$$

When the hue value of the pixel processed by the enhancement process is greater than 0° and less than 120°, C2 represents a red grayscale value of the pixel processed by the enhancement process, C1 represents a blue grayscale value of the pixel processed by the enhancement process, and C3 represents a green grayscale value of the pixel processed by the enhancement process.

When the hue value of the pixel processed by the enhancement process is greater than 120° and less than 240°, C1 represents a red grayscale value of the pixel processed by the enhancement process, C3 represents a blue grayscale value of the pixel processed by the enhancement process, and C2 represents a green grayscale value of the pixel processed by the enhancement process.

When the hue value of the pixel processed by the enhancement process is greater than 240° and less than 360°, C3 represents a red grayscale value of the pixel processed by the enhancement process, C2 represents a blue grayscale value of the pixel processed by the enhancement process, and C1 represents a green grayscale value of the pixel processed by the enhancement process.

Subsequently, the color saturation value of the given pixel is rectified according to the red grayscale value, the blue grayscale value and the green grayscale value of the given pixel which has been performed with the enhancement process. Specific operations are as follows.

When C2 is less than 1, ie the maximum grayscale value, and C3 is less than 1, a color saturation value of a given pixel is not rectified.

When C2 is greater than 1, the hue value and the intensity value are kept unchanged, and a color saturation value of a given pixel is rectified. The post-rectified color saturation value of a given pixel S_ame is calculated by the following formula:

$$1 = I\left[1 + \frac{S\_ame^* \cos\hat{H}}{\cos(60° - \hat{H})}\right]$$

When C3 is greater than 1, the hue value and the intensity value are kept unchanged, and a color saturation value of a given pixel is rectified. The post-rectified color saturation value of a given pixel S_ame is calculated by the following formulas:

$$1 = 3I - (C1 + C2)$$

$$C1 = I(1 - S\_ame)$$

-continued $$C2 = I\left[1 + \frac{S\_ame^* \cos \hat{H}}{\cos(60° - \hat{H})}\right]$$

Because the hue value and the intensity value are kept unchanged during the rectification of the color saturation data, a generation of a color shift is preferably able to be avoided. Next, go the step S104.

In the S104, to facilitate the image display, the post-rectified hue value, color saturation value, and intensity value of each pixel of the preset image are converted into a post-rectified red, green, and blue grayscale values of each pixel of a preset image. Specific conversions are performed according to the following formulas:

$$C1' = I(1 - S\_ame)$$

$$C2' = I\left[1 + \frac{S\_ame^* \cos \hat{H}}{\cos(60° - \hat{H})}\right]$$

$$C3' = I - (C1' + C2')$$

When the hue value of the given pixel after be rectified is greater than 0° and less than 120°, C2' represents a red grayscale value of given pixel after being rectified, C1' represents a blue grayscale value of the given pixel after being rectified, and C3' represents a green grayscale value of the given pixel after being rectified.

When the hue value of the given pixel after being rectified is greater than 120° and less than 240°, C1' represents a red grayscale value of the given pixel after being rectified, C3' represents a blue grayscale value of the given pixel after being rectified, and C2' represents a green grayscale value of the given pixel after being rectified.

When the hue value of the given pixel after being rectified is greater than 240° and less than 360°, C3' represents a red grayscale value of the given pixel after being rectified, C2' represents a blue grayscale value of the given pixel after being rectified, and C1' represents a green grayscale value of the given pixel after being rectified.

As such, these image enhancement processes for the image enhancement method of the preferred embodiment are complete.

The image enhancement method of the present invention performs enhancement processes and rectification processes on a color saturation value of a given pixel by means of a basic principle, i.e. keeping a hue value of each pixel unchanged, as a result, and a phenomenon of a color shift generated in the prior art can be avoided and the technical problem of a color shift which is prone to be generated in the conventional image enhancement method is solved.

In summary, while the present invention has been described preferred embodiments, it is understood that the above-described preferred embodiments are not intended to limit the present invention. One of ordinary skill in the art, without departure from the spirit and scope of the invention, can make various kinds of modifications and variations, and the scope of the present invention is to be defined by the claims.

What is claimed is:

1. An image enhancement method for a preset image displayed on a display, the preset image comprising pixels, and the image enhancement method comprising:

a hue value converting step, wherein the hue value converting step comprises converting a red grayscale value, a green grayscale value, and a blue grayscale value for each pixel of the preset image represented in an RGB color model into a hue value, a color saturation value, and an intensity value for each pixel of the preset image represented in an HSI color space;

an enhancing step, wherein the enhancing step comprises performing an enhancement process on the color saturation value for each pixel of the preset image;

a rectifying step, wherein the enhancing step comprises rectifying the color saturation value for each pixel of the preset image according to the intensity value of each pixel of the preset image and a preset intensity threshold to avoid a color shift phenomenon of the preset image;

a grayscale value converting step, wherein the grayscale value converting step comprises converting the hue value, the color saturation value, and the intensity value for each pixel of the preset image, which has been rectified as a rectified preset image, into a red grayscale value, a green grayscale value, and a blue grayscale value for each pixel of the rectified preset image to facilitate the image display; and a displaying step, wherein the displaying step comprises displaying the preset image on the display after the hue value converting step, the enhancing step, rectifying step, and the grayscale value converting step of the preset image;

wherein the red grayscale value, the green grayscale value, and the blue grayscale value for each pixel of the preset image represented in the RGB color model are converted into the hue value, the color saturation value, and the intensity value for each pixel of a preset image represented in an HSI color space according to the following formulas:

$$H = \begin{cases} \theta & B \leq G \\ 360 - \theta & B > G \end{cases}$$

$$\theta = \arccos\left[\frac{\{(R-G) + (R-B)\}/2}{\sqrt{(R-G)^2 + (R-B)(G-B)}}\right]$$

$$S = 1 - \frac{3}{(R+G+B)}[\min(R, G, B)]$$

$$I = \frac{1}{3}(R + G + B)$$

where R is a red grayscale value of a given pixel; B is a blue grayscale value of a given pixel; G is a green grayscale value of a given pixel; H is a hue value of a given pixel; S is a saturation value of a given pixel; and I is an intensity value of a given pixel;

wherein the following formula is used to perform the enhancement process on the color saturation value for each pixel of the preset image:

$$S\_enh = S^*(\min(R,G,B)/\max(R,G,B))$$

where S_enh is a color saturation value of a given pixel which has been subjected to the enhancement process; min (R, G, B) is a minimum value among the red grayscale value of a given pixel, the green grayscale value of a given pixel, and the blue grayscale value of a given pixel; max (R, G, B) is a maximum value among the red grayscale value of a given pixel, the green grayscale value of a given pixel, and the blue grayscale value of a given pixel.

2. The image enhancement method according to claim 1, wherein the step of rectifying the color saturation value for each pixel of the preset image to avoid a color shift phenomenon of the preset image according to the intensity value and a preset intensity threshold of each pixel of the preset image further comprises:

determining whether the intensity value of a given pixel in the preset image is greater than the preset intensity threshold; and rectifying the color saturation value of the given pixel in light of the following formula when the intensity value of the given pixel is greater than the preset intensity threshold:

$$S\_ame = \begin{cases} S\_enh & S\_enh \leq 2\left(\frac{1}{I} - 1\right) \\ 2\left(\frac{1}{I} - 1\right) & S\_enh > 2\left(\frac{1}{I} - 1\right) \end{cases}$$

where S_ame is a rectified color saturation value of the given pixel.

3. The image enhancement method according to claim 2, wherein the step of rectifying the color saturation value for each pixel of the preset image to avoid a color shift phenomenon of the preset image according to the intensity value and a preset intensity threshold of each pixel of the preset image further comprises:

calculating a red grayscale value, a green grayscale value, and a blue grayscale value of the given pixel for a condition that the given pixel has been subjected to an enhancement process when the intensity value of a given pixel is less than or equal to the preset intensity threshold; and rectifying the color saturation value of the given pixel according to the red grayscale value, the blue grayscale value, and the green grayscale value of the given pixel for the condition that the given pixel has been subjected to the enhancement process.

4. The image enhancement method according to claim 3, wherein the red grayscale value, the green grayscale value, and the blue grayscale value for the condition that the given pixel has been subjected to the enhancement process are calculated by the following formulas:

$$C1 = I(1 - S\_enh)$$

$$C2 = I\left[1 + \frac{S\_enh^*\cos \hat{H}}{\cos(60° - \hat{H})}\right]$$

$$C3 = 3I - (C1 + C2)$$

wherein when the hue value of the pixel processed by the enhancement process is greater than 0° and less than 120°, C2 represents a red grayscale value of the pixel processed by the enhancement process, C1 represents a blue grayscale value of the pixel processed by the enhancement process, and C3 represents a green grayscale value of the pixel processed by the enhancement process;

wherein when the hue value of the pixel processed by the enhancement process is greater than 120° and less than 240°, C1 represents a red grayscale value of the pixel processed by the enhancement process, C3 represents a blue grayscale value of the pixel processed by the enhancement process, and C2 represents a green grayscale value of t the pixel processed by the enhancement process; and wherein when the hue value of the pixel processed by the enhancement process is greater than 240° and less than 360°, C3 represents a red grayscale value of the pixel processed by the enhancement process, C2 represents a blue grayscale value of the pixel processed by the enhancement process, and C1 represents a green grayscale value of the pixel processed by the enhancement process.

5. The image enhancement method according to claim 4, wherein the step of rectifying the color saturation value of the given pixel according to the red grayscale value, the blue grayscale value and the green grayscale value of the given pixel which have been subjected to the enhancement process comprises:

when C2 is less than 1 and C3 is less than 1, the color saturation value of the given pixel is not rectified.

6. The image enhancement method according to claim 4, wherein the step of rectifying the color saturation value of the given pixel according to the red grayscale value, the blue grayscale value and the green grayscale value of the given pixel which have been subjected to the enhancement process comprises:

when C2 is greater than 1, the color saturation value of the given pixel after being rectified is calculated by the following formula:

$$1 = I\left[1 + \frac{S\_ame^*\cos \hat{H}}{\cos(60° - \hat{H})}\right].$$

7. The image enhancement method according to claim 4, wherein the step of rectifying the color saturation value of the given pixel according to the red grayscale value, the blue grayscale value, and the green grayscale value of the given pixel which have been subjected to the enhancement process comprises:

when C3 is greater than 1, the color saturation value of the given pixel after being rectified is calculated by the following formulas:

$$1 = 3I - (C1 + C2)$$

$$C1 = I(1 - S\_ame)$$

$$C2 = I\left[1 + \frac{S\_ame^*\cos \hat{H}}{\cos(60° - \hat{H})}\right].$$

8. The image enhancement method according to claim 1, wherein the hue value, color saturation value, and intensity value for each pixel of the rectified preset image are converted into a red, green, and blue grayscale values for each pixel of the rectified preset image according to the following formulas:

$$C1' = I(1 - S\_ame)$$

$$C2' = I\left[1 + \frac{S\_ame^*\cos \hat{H}}{\cos(60° - \hat{H})}\right]$$

-continued $$C3' = 3I - (C1' + C2')$$

wherein when the hue value of the given pixel after be rectified is greater than 0° and less than 120°, C2' represents a red grayscale value of given pixel after being rectified, C1' represents a blue grayscale value of the given pixel after being rectified, and C3' represents a green grayscale value of the given pixel after being rectified;

wherein when the hue value of the given pixel after being rectified is greater than 120° and less than 240°, C1' represents a red grayscale value of the given pixel after being rectified, C3' represents a blue grayscale value of the given pixel after being rectified, and C2' represents a green grayscale value of the given pixel after being rectified; and wherein when the hue value of the given pixel after being rectified is greater than 240° and less than 360°, C3' represents a red grayscale value of the given pixel after being rectified, C2' represents a blue grayscale value of the given pixel after being rectified, and C1' represents a green grayscale value of the given pixel after being rectified.

9. An image enhancement method for a preset image displayed on a display, the preset image comprising pixels, and the image enhancement method comprising:

a hue value converting step, wherein the hue value converting step comprises converting a red grayscale value, a green grayscale value, and a blue grayscale value for each pixel of a preset image represented in an RGB color model into a hue value, a color saturation value, and an intensity value for each pixel of the preset image represented in an HSI color space;

an enhancing step, wherein the enhancing step comprises performing an enhancement process on the color saturation value for each pixel of the preset image;

a rectifying step, wherein the enhancing step comprises rectifying the color saturation value for each pixel of the preset image according to the intensity value of each pixel of the preset image and a preset intensity threshold to avoid a color shift phenomenon of the preset image; and a grayscale value converting step, wherein the grayscale value converting step comprises converting the hue value, the color saturation value, and the intensity value for each pixel of the preset image, which has been rectified as a rectified preset image, into a red grayscale value, a green grayscale value, and a blue grayscale value for each pixel of the rectified preset image to facilitate the image display; and a displaying step, wherein the displaying step comprises displaying the preset image on the display after the hue value converting step, the enhancing step, rectifying step, and the grayscale value converting step of the preset image.

10. The image enhancement method according to claim 9, wherein the red grayscale value, the green grayscale value, and the blue grayscale value for each pixel of the preset image represented in the RGB color model are converted into the hue value, the color saturation value, and the intensity value for each pixel of a preset image represented in an HSI color space according to the following formulas:

$$H = \begin{cases} \theta & B \leq G \\ 360 - \theta & B > G \end{cases}$$

$$\theta = \arccos\left[\frac{\{(R-G)+(R-B)\}/2}{\sqrt{(R-G)^2 + (R-B)(G-B)}}\right]$$

$$S = 1 - \frac{3}{(R+G+B)}[\min(R, G, B)]$$

$$I = \frac{1}{3}(R + G + B)$$

where R is a red grayscale value of a given pixel; B is a blue grayscale value of a given pixel; G is a green grayscale value of a given pixel; H is a hue value of a given pixel; S is a saturation value of a given pixel; and I is an intensity value of a given pixel.

11. The image enhancement method according to claim 9, wherein the following formula is used to perform the enhancement process on the color saturation value for each pixel of the preset image:

$$S\_enh = S \cdot (\min(R,G,B)/\max(R,G,B))$$

where S_enh is a color saturation value of a given pixel which has been subjected to the enhancement process; min (R, G, B) is a minimum value among the red grayscale value of a given pixel, the green grayscale value of a given pixel, and the blue grayscale value of a given pixel; max (R, G, B) is a maximum value among the red grayscale value of a given pixel, the green grayscale value of a given pixel, and the blue grayscale value of a given pixel.

12. The image enhancement method according to claim 9, wherein the step of rectifying the color saturation value for each pixel of the preset image to avoid a color shift phenomenon of the preset image according to the intensity value and a preset intensity threshold of each pixel of the preset image further comprises:

determining whether the intensity value of a given pixel in the preset image is greater than the preset intensity threshold; and rectifying the color saturation value of the given pixel in light of the following formula when the intensity value of the given pixel is greater than the preset intensity threshold:

$$S\_ame = \begin{cases} S\_enh & S\_enh \leq 2\left(\frac{1}{I} - 1\right) \\ 2\left(\frac{1}{I} - 1\right) & S\_enh > 2\left(\frac{1}{I} - 1\right) \end{cases}$$

where S_ame is a rectified color saturation value of the given pixel.

13. The image enhancement method according to claim 12, wherein the step of rectifying the color saturation value for each pixel of the preset image to avoid a color shift phenomenon of the preset image according to the intensity value and a preset intensity threshold of each pixel of the preset image further comprises:

calculating a red grayscale value, a green grayscale value, and a blue grayscale value of the given pixel for a condition that the given pixel has been subjected to an enhancement process when the intensity value of a given pixel is less than or equal to the preset intensity threshold; and rectifying the color saturation value of the given pixel according to the red grayscale value, the blue grayscale value, and the green grayscale value of the given pixel for the condition that the given pixel has been subjected to the enhancement process.

14. The image enhancement method according to claim 13, wherein the red grayscale value, the green grayscale value, and the blue grayscale value for the condition that the given pixel has been subjected to the enhancement process are calculated by the following formulas:

$$C1 = I(1 - S\_enh)$$
$$C2 = I\left[1 + \frac{S\_enh^* \cos \hat{H}}{\cos(60° - \hat{H})}\right]$$
$$C3 = 3I - (C1 + C2)$$

wherein when the hue value of the pixel processed by the enhancement process is greater than 0° and less than 120°, C2 represents a red grayscale value of the pixel processed by the enhancement process, C1 represents a blue grayscale value of the enhanced pixel, and C3 represents a green grayscale value of the pixel processed by the enhancement process;

wherein when the hue value of the pixel processed by the enhancement process is greater than 120° and less than 240°, C1 represents a red grayscale value of the pixel processed by the enhancement process, C3 represents a blue grayscale value of the pixel processed by the enhancement process, and C2 represents a green grayscale value of the pixel processed by the enhancement process; and wherein when the hue value of the pixel processed by the enhancement process is greater than 240° and less than 360°, C3 represents a red grayscale value of the pixel processed by the enhancement process, C2 represents a blue grayscale value of the pixel processed by the enhancement process, and C1 represents a green grayscale value of the pixel processed by the enhancement process.

15. The image enhancement method according to claim 14, wherein the step of rectifying the color saturation value of the given pixel according to the red grayscale value, the blue grayscale value and the green grayscale value of the given pixel which have been subjected to the enhancement process comprises:

when C2 is less than 1 and C3 is less than 1, the color saturation value of the given pixel is not rectified.

16. The image enhancement method according to claim 14, wherein the step of rectifying the color saturation value of the given pixel according to the red grayscale value, the blue grayscale value and the green grayscale value of the given pixel which have been subjected to the enhancement process comprises:

when C2 is greater than 1, the color saturation value of the given pixel after being rectified is calculated by the following formula.

$$1 = I\left[1 + \frac{S\_ame^* \cos \hat{H}}{\cos(60° - \hat{H})}\right].$$

17. The image enhancement method according to claim 14, wherein the step of rectifying the color saturation value of the given pixel according to the red grayscale value, the blue grayscale value and the green grayscale value of the given pixel which have been subjected to the enhancement process comprises:

when C3 is greater than 1, the color saturation value of the given pixel after being rectified is calculated by the following formulas:

$$1 = 3I - (C1 + C2)$$
$$C1 = I(1 - S\_ame)$$
$$C2 = I\left[1 + \frac{S\_ame^* \cos \hat{H}}{\cos(60° - \hat{H})}\right].$$

18. The image enhancement method according to claim 9, wherein the hue value, the color saturation value, and the intensity value for each pixel of the rectified preset image are converted into a post-rectified red, green, and blue grayscale values for each pixel of a preset image according to the following formulas:

$$C1' = I(1 - S\_ame)$$
$$C2' = I\left[1 + \frac{S\_ame^* \cos \hat{H}}{\cos(60° - \hat{H})}\right]$$
$$C3' = 3I - (C1' + C2')$$

wherein when the hue value of the given pixel after be rectified is greater than 0° and less than 120°, C2' represents a red grayscale value of given pixel after being rectified, C1' represents a blue grayscale value of the given pixel after being rectified, and C3' represents a green grayscale value of the given pixel after being rectified;

wherein when the hue value of the given pixel after being rectified is greater than 120° and less than 240°, C1' represents a red grayscale value of the given pixel after being rectified, C3' represents a blue grayscale value of the given pixel after being rectified, and C2' represents a green grayscale value of the given pixel after being rectified; and wherein when the hue value of the given pixel after being rectified is greater than 240° and less than 360°, C3' represents a red grayscale value of the given pixel after being rectified, C2' represents a blue grayscale value of the given pixel after being rectified, and C1' represents a green grayscale value of the given pixel after being rectified.

* * * * *